Figure 11:
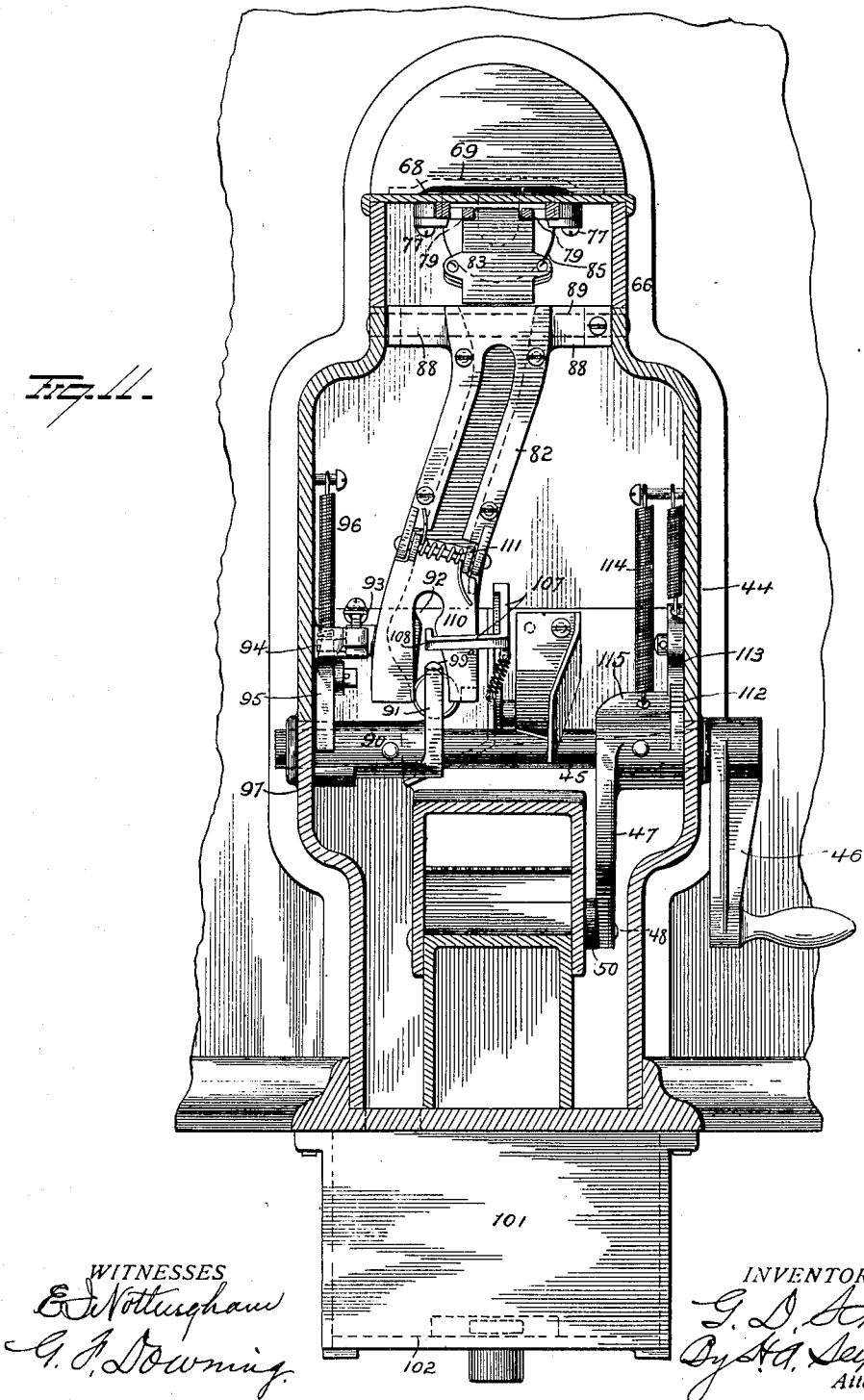

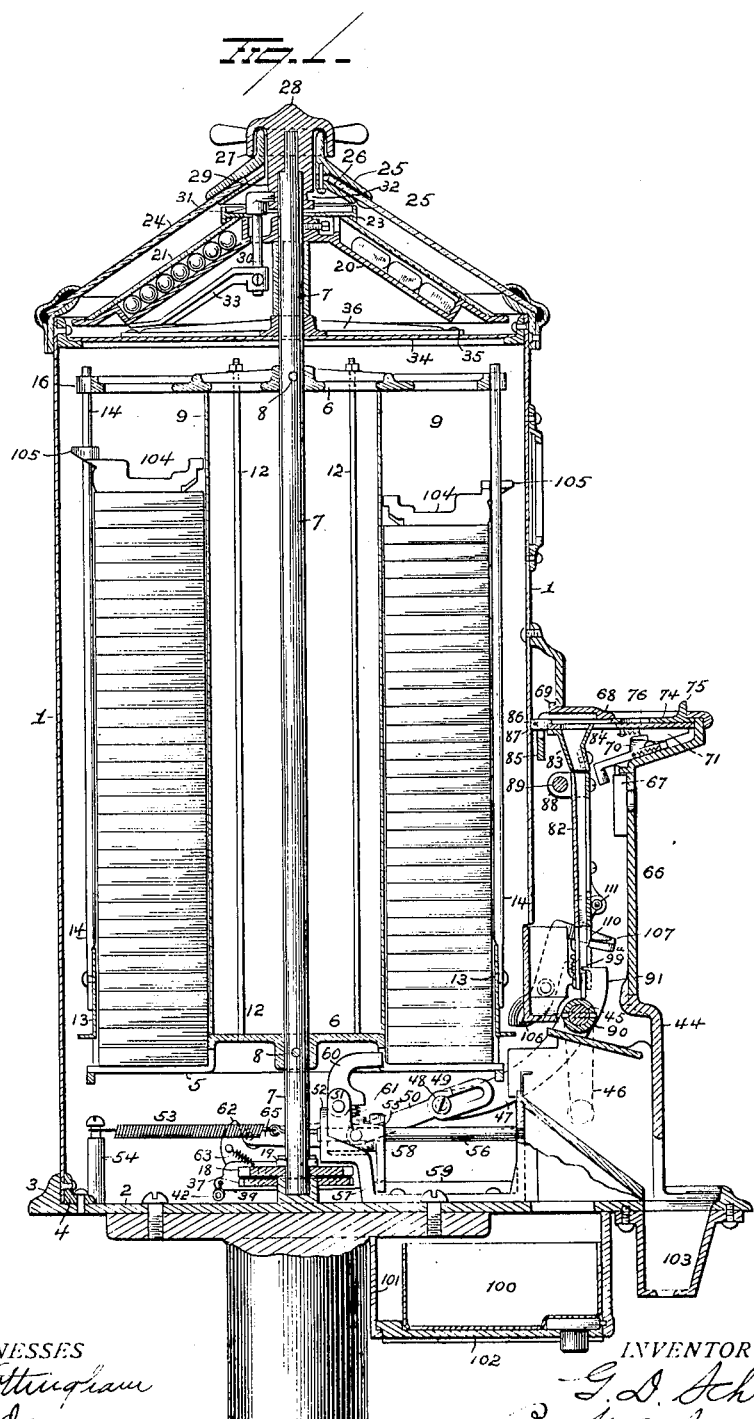

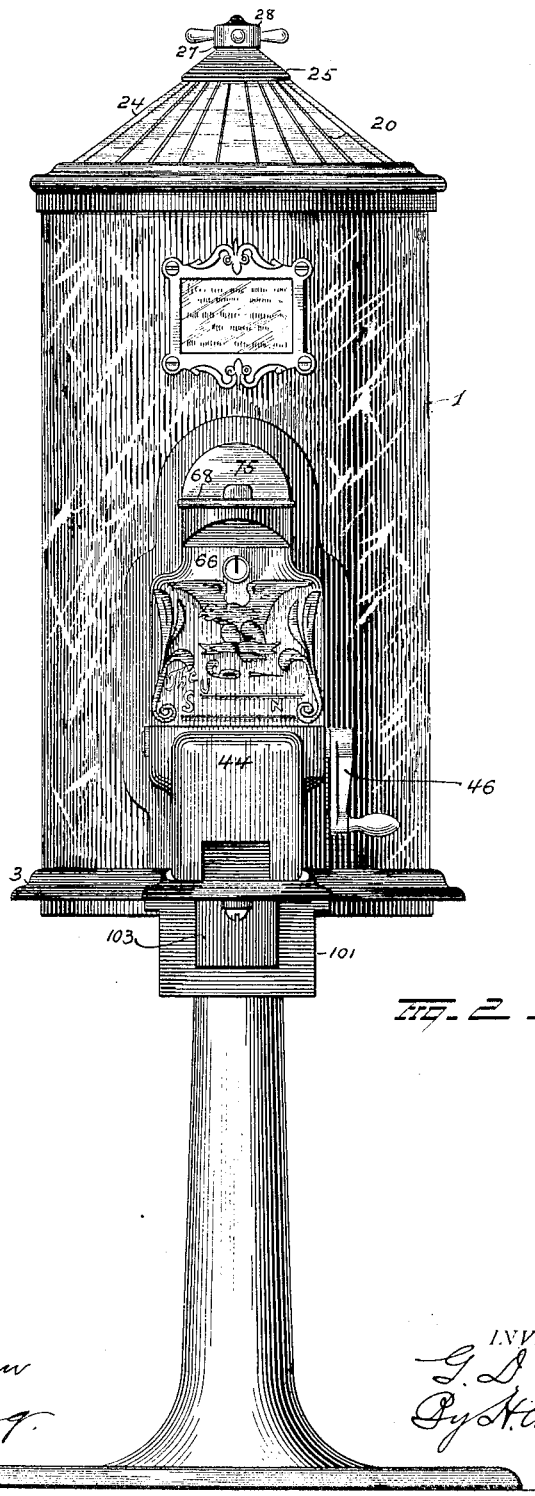

No. 892,687. PATENTED JULY 7, 1908.
G. D. SCHRUM.
VENDING MACHINE.
APPLICATION FILED FEB. 5, 1907.
8 SHEETS—SHEET 3.
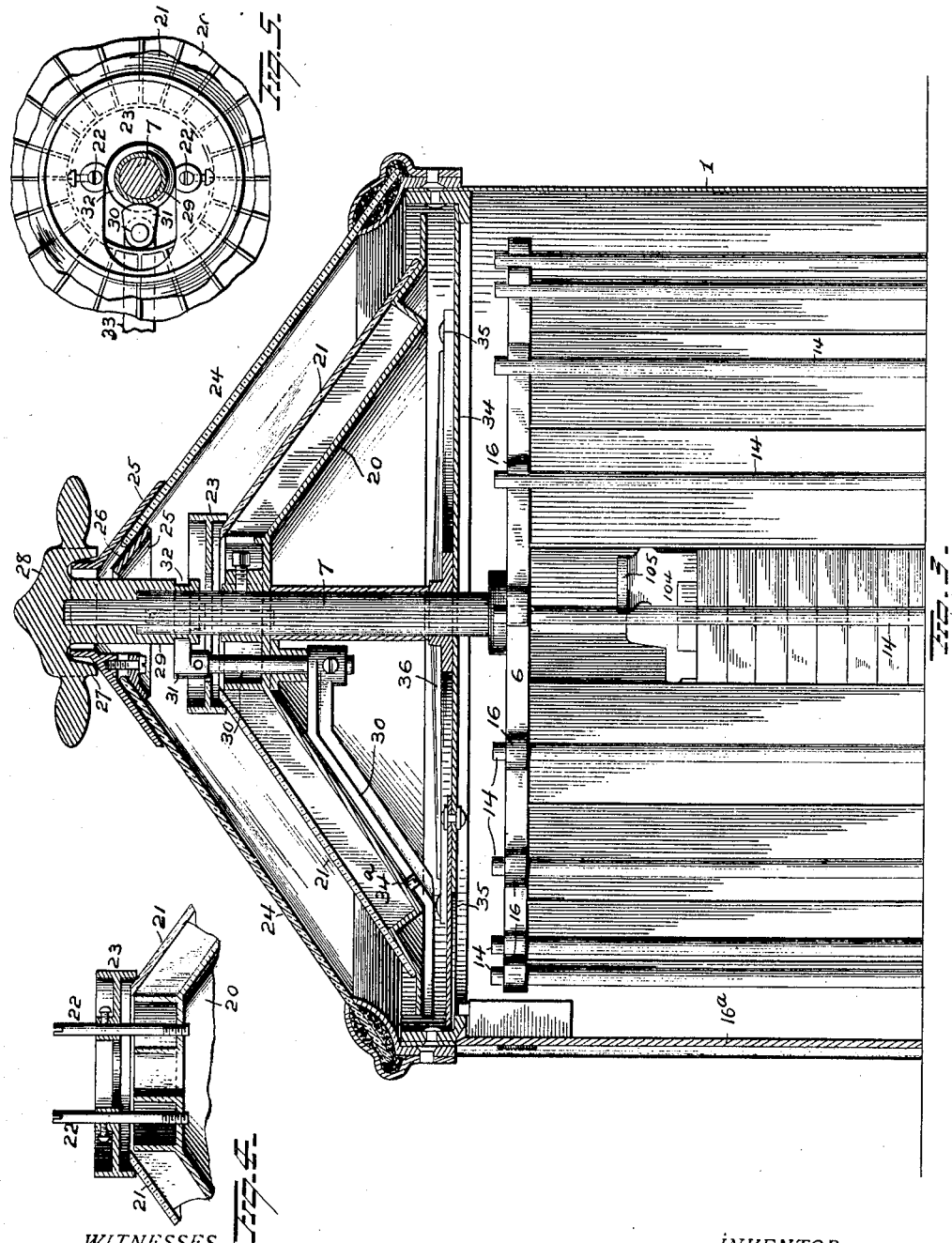
WITNESSES
INVENTOR No. 892,687.
PATENTED JULY 7, 1908.
G. D. SCHRUM.
VENDING MACHINE.
APPLICATION FILED FEB. 5, 1907.
8 SHEETS—SHEET 4.
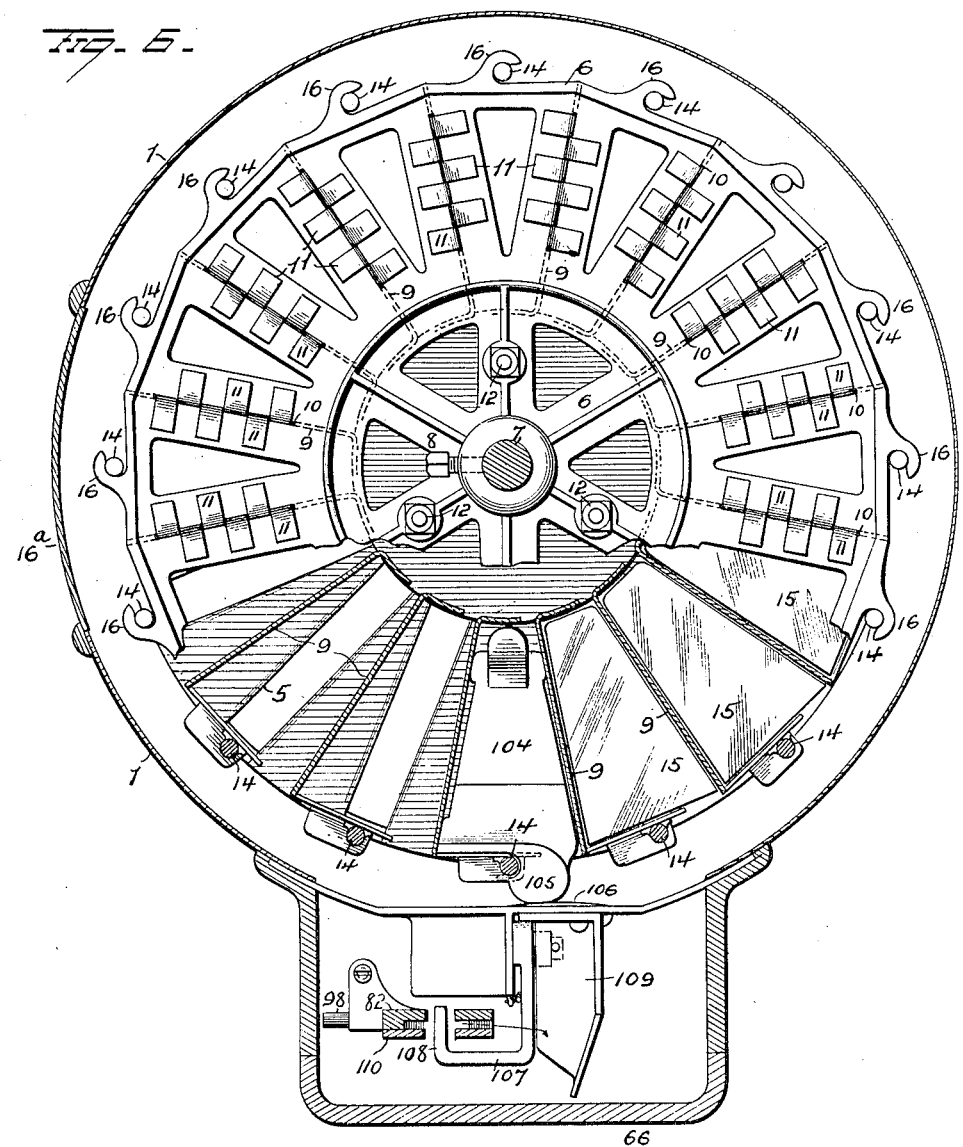
WITNESSES
INVENTOR No. 892,687. PATENTED JULY 7, 1908.
G. D. SCHRUM.
VENDING MACHINE.
APPLICATION FILED FEB. 5, 1907.
8 SHEETS—SHEET 5.
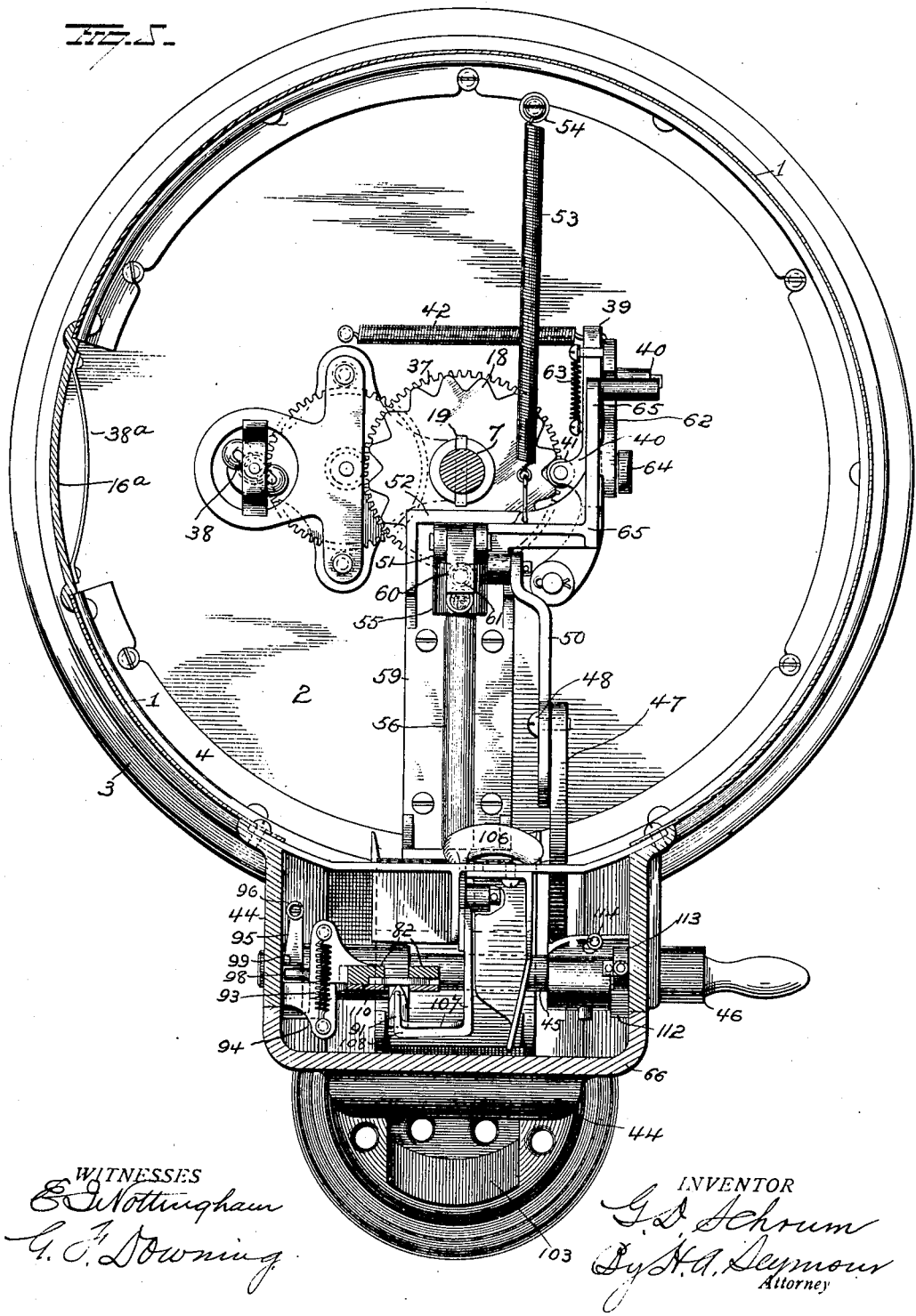
WITNESSES
INVENTOR No. 892,687.
PATENTED JULY 7, 1908.
G. D. SCHRUM.
VENDING MACHINE.
APPLICATION FILED FEB. 5, 1907.
8 SHEETS—SHEET 6.
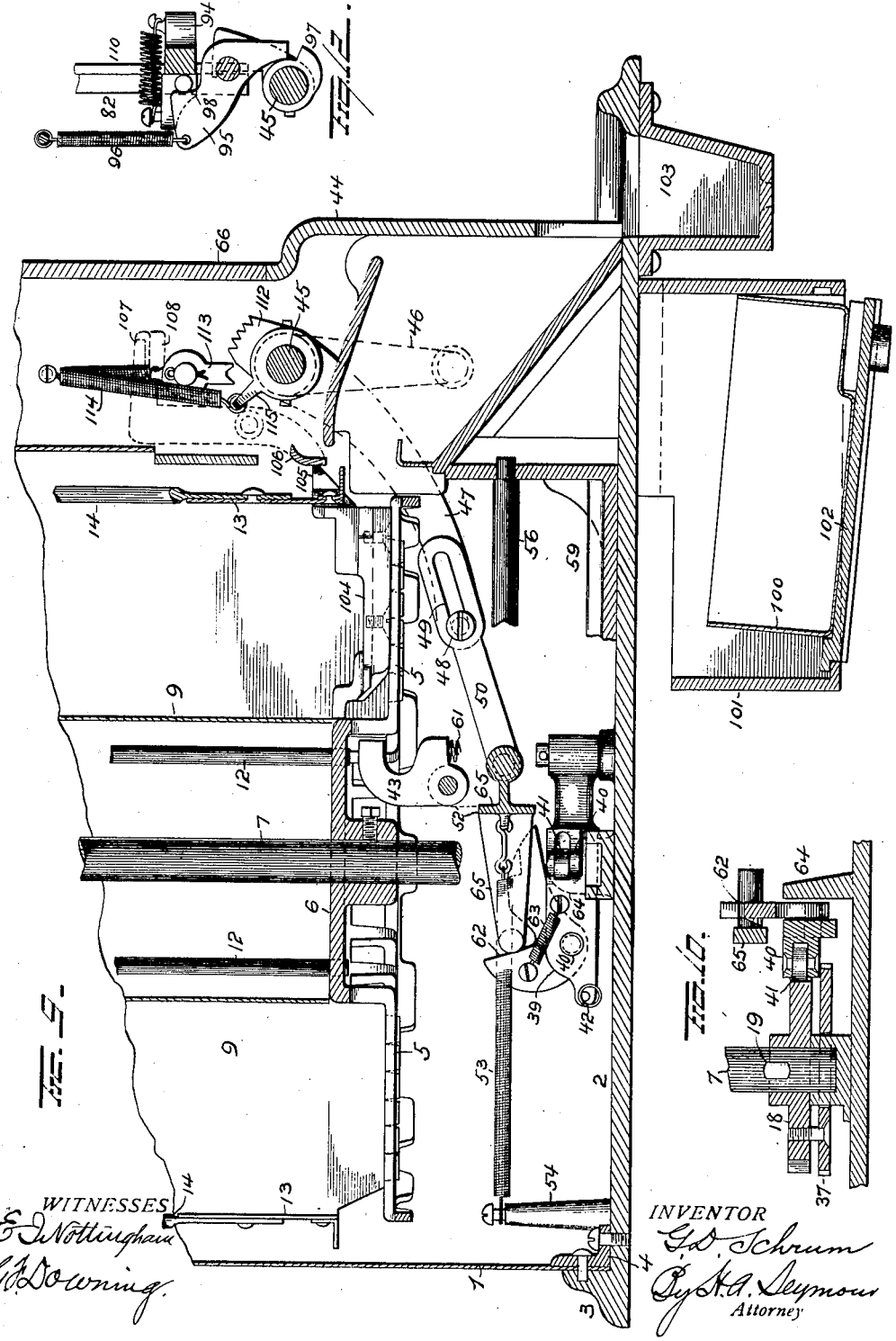
WITNESSES
E. J. Nottingham
G. E. Downing
INVENTOR
G. D. Schrum
By H. A. Seymour
Attorney No. 892,687.

PATENTED JULY 7, 1908.

G. D. SCHRUM.
VENDING MACHINE.
APPLICATION FILED FEB. 5, 1907.

8 SHEETS—SHEET 7.

WITNESSES
E. J. Nottingham
G. F. Downing

INVENTOR
G. D. Schrum
By H. A. Seymour
Attorney

No. 892,687.

PATENTED JULY 7, 1908.

G. D. SCHRUM.
VENDING MACHINE.
APPLICATION FILED FEB. 5, 1907.

8 SHEETS—SHEET 8.

WITNESSES
E. J. Nottingham
G. F. Downing

INVENTOR
G. D. Schrum
By H. A. Seymour
Attorney

UNITED STATES PATENT OFFICE.

GEORGE D. SCHRUM, OF DETROIT, MICHIGAN, ASSIGNOR, BY MESNE ASSIGNMENTS, TO UNIVERSAL SALESMAN CO., OF DETROIT, MICHIGAN.

VENDING-MACHINE.

No. 892,687.          Specification of Letters Patent.          Patented July 7, 1908.

Application filed February 5, 1907. Serial No. 355,931.

*To all whom it may concern:*

Be it known that I, GEORGE D. SCHRUM, a resident of Detroit, in the county of Wayne and State of Michigan, have invented certain new and useful Improvements in Vending-Machines; and I do hereby declare the following to be a full, clear, and exact description of the invention, such as will enable others skilled in the art to which it appertains to make and use the same.

My invention relates to improvements in vending machines, an object of the invention being to provide an improved construction of rotary frame comprising a series of vertical channels for goods, and improved mechanism for ejecting goods from any channel.

A further object is to provide rotary frame having a series of vertical channels for goods, with display compartments above the same demonstrating the goods in the different channels, and provide improved means for turning the frame, improved mechanism for limiting the speed of rotation, and improved means for locking the turning knob and other parts in assembled formation.

A further object is to provide improved mechanism for centering the frame so as to properly present a goods channel to eject the goods therefrom, and provide an improved goods ejector and improved means for automatically locking the frame against turning during the operation of the ejector and holding the frame stationary until the ejector returns to its normal position.

A further object is to provide an improved dust and water tight inclosing casing and one which has no exposed screws or other devices which can be removed or tampered with from the outside of the machine.

A further object is to provide improved means for securing the coin slide plate on its casing which means can only be released when the front plate is removed.

A further object is to provide improved mounting for the glass at the top and the cylinder at the bottom to exclude all dust and water.

With these and other objects in view, the invention consists in certain novel features of construction and combinations and arrangements of parts as will be more fully hereinafter described and pointed out in the claims.

Figure 13:
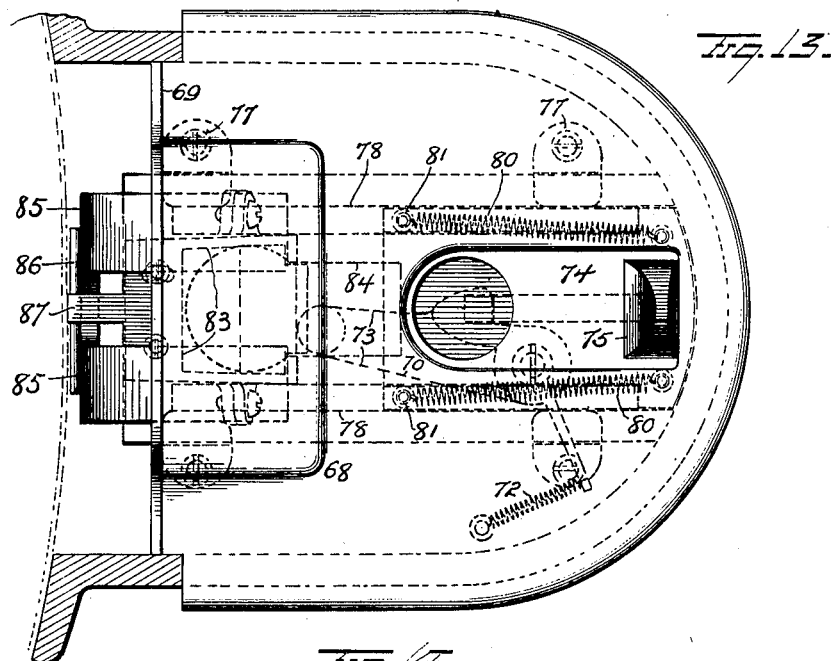
Figure 14:
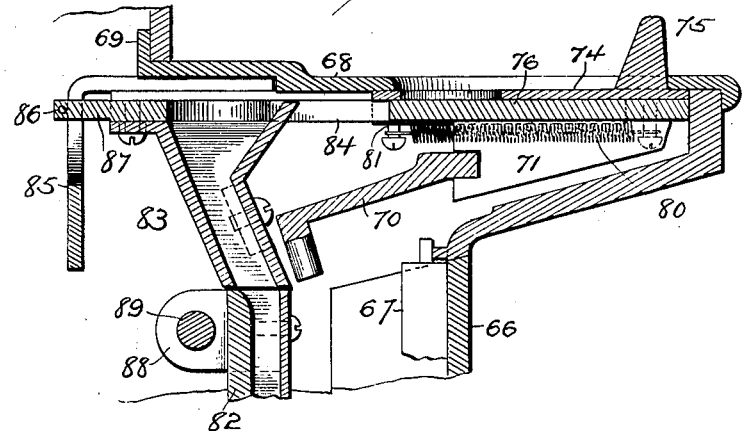
Figure 15:
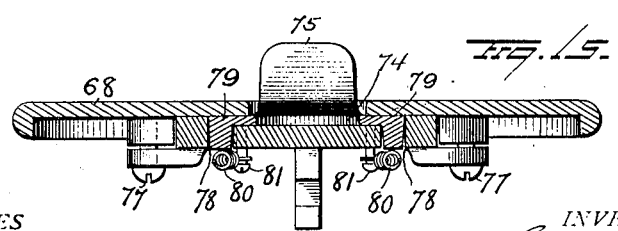

In the accompanying drawings, Figure 1 is a view in longitudinal section illustrating my improvements. Fig. 2 is a view in front elevation. Fig. 3 is an enlarged view in vertical section of the upper portion of the machine. Figs. 4 and 5 are detail views of the display tray and knob securing devices. Fig. 6 is a view in section through the casing showing the goods cylinder partly in plan and partly in section. Fig. 7 is an enlarged view illustrating the manner of securing the cylinder partitions in place. Fig. 8 is a view in horizontal section with cylinder removed. Fig. 9 is a fragmentary view in vertical section through the bottom portion of the machine. Fig. 10 is an enlarged view in section through star wheel and locking mechanism therefor. Fig. 11 is a front view of coin controlling mechanism. Fig. 12 is a detail view illustrating the ejector shaft locking mechanism and Figs. 13, 14 and 15 are views illustrating the coin slide and coöperating mechanism.

1 represents a cylindrical casing of the machine, supported on a base plate 2, and secured between outer and inner rings 3 and 4 respectively, screws or other fastening devices being operated from the inside and projected through the inner ring 4, casing 1, and into outer ring 3 without projecting through the latter, and it is to be understood that all outside parts which are secured by screws the headed ends of the screws are at the inside of the casing and are not exposed from the outside.

5 represents my improved rotary cylinder comprising an annular series of vertical channels for cartons or boxes of goods. This cylinder 5 comprises two spiders 6, spaced apart and adjustably secured on a central shaft 7 by set screws 8 and connected by partition plates 9 to form the several compartments or channels. The partition plates are disposed radially and are provided with projecting ends extending through radial slots 10 in spiders 6 and the ends of the partition plates are slit forming a number of tongues 11 to be bent at right angles and against the spiders to firmly secure the partition plates and the tongues are bent in alternate directions so that half the tongues project in one direction and half in the other to better secure the parts together. To further secure the spiders and partition plates, longitudinal stay rods 12 project through both spiders and have nuts screwed on their ends to firmly clamp the cylinder in rigid formation. The lower portions of the partition plates are made with lips 13 extending at right angles thereto, and to which rods 14 are pivotally secured and said rods 14 extend upward to confine the cartons or boxes 15 in the channels and are caught under spring tongues 16 to hold them in proper position but which permit the rods to be readily swung to one side when it is desired to fill a channel. The lower edges of lips 13 are spaced from the lower spider of the cylinder, which latter constitutes the bottom of all the channels, sufficient to permit a single carton or box to be moved out of the channel by the improved ejector to be hereinafter described, and ready access can be had to the cylinder through an opening in the side of the casing, normally closed by a plate or door 16ª, which latter is provided with a lock 17 to secure it in closed position.

The lower end of the shaft 7, supporting the cylinder is located in the hub of a star wheel 18, having rotary mounting on the base plate 2, and a cross pin 19 is projected through the shaft 7 and its protruding ends are located in notches in the hub of the star wheel 18 to compel the star wheel to turn with the cylinder. This star wheel 18 is provided with a notch for each and every goods channel in the cylinder, and improved centering mechanism to be hereinafter described, is provided to engage the star wheel and hold the cylinder so as to properly deliver from the desired channel.

On the shaft 7 above the goods containing cylinder, a display tray 20 is secured by a set screw and is provided with a series of compartments, located above the channels and containing the goods vended from the channels directly below, and hence indicating to the purchaser the character of goods contained in the channels below. This tray 20 is preferably of general conical form having a conical transparent cover 21 over the tray to confine the goods to their proper display trays and preventing them from being thrown out by the rapid turning of the cylinder, as it is to be understood that the cylinder can be turned to present any display tray and channel containing the same goods as in the display compartment above, to the front or delivery point of the machine.

The display tray is provided in a central depression at its upper end, with upright rods 22 to enter openings in a cap block or collar 23 spaced from the transparent cover by a gasket, and set screws are provided in the cap block or collar 23 to secure the latter to the rods 22 and effectually hold the transparent cover on the display tray.

Above the display tray, and suitably spaced therefrom is a transparent cover 24, securely clamped between water and dust tight rings at its lower end, and the outer of the said pair of rings at the lower end of cover 24 is constructed to inclose the upper end of casing 1 and exclude water and dust from the interior of the machine, and a hand or other device is preferably located on the transparent cover 24 to indicate the point of delivery to which the channel must be turned to deliver goods therefrom. The upper end of the cover is inclosed between metal plates 25, and rubber gaskets 26 and the upper plate has a sleeve or collar extension to receive the shaft 7 which collar or sleeve extension projects up under a depending lip or apron 27 on a knob or hand hold 28 and the latter will prevent the entrance of water at this point.

The knob or hand hold 28 is made with a sleeve 29 to receive the upper end of shaft 7 and has an angular bore to receive the angular upper end of the shaft 7 and compel the shaft to turn with the knob, and the latter is securely locked on the shaft by improved mechanism which will now be explained.

A short vertical shaft 30 is supported in the central depression of display tray and a cam 31 is secured on the shaft 30 and adapted to enter an annular groove 32 in the lower end of sleeve 29. This shaft 30 is turned by a long arm 33 below the display tray and to which access can be had through the opening in the casing wall and operate the lock as follows: To unlock the knob, the operator inserts his hand through the opening in the casing wall and holds the arm 33 while with the other hand he turns knob 28, which will cause shaft 30 to turn and move cam 31 out of the groove 32, when the knob can be removed. To lock the knob, it is turned in the opposite direction while the arm 33 is held to cause shaft 30 to turn and move cam 31 into groove 32 and the shaft 30 is mounted slightly at an incline so that when the cam is in locking position the arm 33 will wedge against the bottom of the display tray to prevent any accidental swinging thereof and a stop 34ª is provided to limit the movement of the arm 33.

A dust plate 34 is located on an internal flange in the upper ring of the casing and is secured by the screws 35 which secure a spider 36 to the flange and the spider 36 has a central bearing for the shaft 7 and also serve to brace the cylinder against collapsing strains.

Below the star wheel 18 and fixed to turn therewith is the driving gear 37 of a chain of gearing to operate a centrifugal brake or governor 38 which latter serves to prevent the rapid turning of the cylinder which would tend to throw out the bottom cartons in the channels and this is a very necessary feature in a machine of this character, as it has been found that persons will amuse themselves by rapidly turning the cylinder unless some means is provided to prevent it. The brake does not, however, interfere with the easy turning of the cylinder and only checks the turning when the cylinder is whirled. A bowed plate 38ª on the casing door serves to force back any cartons which may project out of their channels.

A pivoted horizontally swinging dog 39 is supported on the base plate 2 and provided between its ends with a lug 40 carrying a roller 41 engaging the periphery of the star wheel and held in contact with the star wheel by a coiled spring 42 connecting the free end of the dog with a fixed screw or pin in the base plate. The roller 41 is of the proper size to move into the notches of the star wheel and as a notch is provided for each and every goods channel in the cylinder, the dog will center the channel so as to properly deliver a carton or box therefrom when the ejector 43 is operated.

44 represents a front casing secured to main casing 1 by screws from the inside of casing 1 and communicating with casing 1 through a suitable opening in the latter. The front casing 44 supports a horizontal shaft 45 having an operating crank arm 46 fixed to one end outside the casing and adapted to turn the shaft when permitted by improved coin controlled mechanism hereinafter pointed out.

A crank arm 47 is secured on shaft 45 inside front casing 44, and is provided with a screw or pin 48 at its free end movable in a slot 49 in a link 50, pivotally connected with an ejector 51. The ejector 51 is normally held in its innermost position against a stop 52 by a coiled spring 53, connecting the ejector with a post 54 on base plate 2 and exerting a straight pull on the ejector to insure the return of the latter to its normal position.

The ejector is made with a tubular bearing 55 mounted to slide on a rod 56 secured in a bracket or frame 57 and a notched finger 58 on the ejector slides on a flange or track 59 on frame 57 to prevent any turning of the ejector at any point throughout its operative movement. An upwardly projecting, preferably curved ejector finger 60 is pivotally secured to the ejector body, and a coiled spring 61 located between shoulders on the finger and body normally holds the finger in erect position to engage behind a carton or box and move the latter from under the pile and out of the machine, and slots are made in the bottom of the cylinder to permit this travel of the ejector finger. On the return, or inward movement of the ejector, the finger 60 tipped by its contact with the cartons in the channel and held in such position by the lowest carton until it passes behind, the same when the spring 61 will move the finger back to operative position ready to eject another carton.

To prevent any movement of the cylinder after the ejector starts to move and in fact until the ejector returns to its normal position a locking lever 62 is provided. This lever 62 is pivotally secured between its ends to centering dog 39, and a coiled spring 63 connects one end of the lever with the dog so as to move the lever to a position between the dog and a fixed post 64 on base plate 2 and prevent the dog from moving and therefore lock the cylinder against turning. This locking lever 62, is however, normally held out of its locking position, by an arm 65 on the ejector, which arm engaging a lug on the lever holds the latter from between the dog 39 and post 64 and permits the dog to freely swing, as long as the ejector is in its innermost position, but just as soon as the ejector begins to travel, the arm 65 is drawn away from lever 62 and the latter promptly locks the dog and cylinder and the cylinder will be securely held until the plunger completes its operation and returns, to move its arm 65 against lever 62 and unlock the dog and cylinder.

A removable plate 66 closes the front of casing 44 and is provided with a lock 67 securing the plate 66 in position and preventing tampering with the coin controlled mechanism by unauthorized persons. The outwardly projecting top portion of casing 44 is closed by a plate 68, having a lip 69 to take under the casing front and made with a depending flange all around its edge to inclose the edge of the casing and exclude water therefrom, and this plate 68 is secured in closed position by a pivoted catch 70. The catch 70 is constructed to engage a keeper 71 on the plate 68 and is normally held in locked position by a spring 72 at one end thereof, while an arm 73 at the other end of the catch can be reached when face plate 66 is removed to unlock top plate 68 and permit the removal thereof and parts carried thereby, should occasion require. It will thus be seen that the simple locking means for the top plate obviates all necessity for screws or other securing means and prevents any possibility of the removal of the plate save by those authorized to do so. This plate 68 carries a coin slide 74 on its under face, exposed through an opening in the plate and having a coin receiving opening of just the proper size to receive the coin desired, and provided with a button or finger hold 75 to permit the slide to be readily pushed inward. The coin slide is located between plate 68 and a guide plate 76 secured to lugs on plate 68 by screws 77 and having parallel slots 78 to receive and guide webs 79 on coin slide 74 and coiled springs 80 connect pins or screws 81 on the webs 79 with pins or screws on guide plate 76 near the ends of slots 78 to return the coin slide to normal position and retain the slide in that position until operated.

A coin receiving hopper 83 is secured to guide plate 76 below an opening therein, and into this hopper the coins are dropped by slide 74 and directed down into a coin chute 82. An opening 84 is provided in guide plate 76 in advance of hopper 83 and while this opening is slightly too small to allow the proper coin to drop out of the slide, should a counterfeit smaller than the proper coin be used, it will be dropped through this opening and never reach the hopper 83 and coin controlled mechanism. A bent magnet 85 having its ends located in a raised portion of plate 68 above the coin slide, is secured in position by a cross pin 86 passed through a lug 87 on guide plate 76. This magnet serves to prevent counterfeits of metal attracted thereby, from dropping down the hopper 83 but holding them in the coin slide compels them to be returned with the slide and fail to operate the machine at all. Counterfeits too large in diameter cannot of course enter the opening in the coin slide and those too thick will prevent the slide from moving inward, and counterfeits which are the proper size and will not be attracted by the magnet will of course pass to the coin controlled mechanism, but unless said counterfeits have the strength of the proper coin they will be bent and thrown out, as will more fully hereinafter appear. It will thus be seen that it is practically impossible to operate the machine by anything but the proper coin, which is of inestimable importance in a vending machine, nor is it possible to clog the machine by inserting one coin after another as the coin chute 82 is constructed to overcome this difficulty and which is a fault with all similar machines in use.

Coin chute 82 is provided with a hinge connection 88 at its upper end with a cross rod 89 connecting the side plates of front casing 44 and terminates at its lower end above a sleeve 90 fixed on shaft 45 and a short crank arm 91 on said sleeve is in line with a central slot 92 in the lower end of chute 82. The chute directs the coin down onto sleeve 90 and maintains the coin in an approximately vertical position and it will be seen that it requires no nice adjustment of the chute to exactly position the coin as the chute may be shifted a considerable distance either back or forth and still direct the coin into the sleeve, and as these machines are subjected to rather rough usage in transportation and in use parts which require nice adjustment are a great source of weakness.

A spring 93 connects the chute 82 and a fixed bracket 94 on casing 44 and holds the chute in normal position and returns the chute to such position and a bell-crank-locking lever 95 is pivoted between its ends to casing 44 and a spring 96 connected to the horizontal member of said lever 95 normally holds the other end of said lever in the path of a lug 97 on sleeve 90 preventing the turning of shaft 45. A pin 98 on chute 82 is located against the approximately horizontal member of lever 95 and when the chute is forced inward (as hereinafter pointed out) the pin 98 will engage a cam enlargement or shoulder 99 on lever 95 to swing the other end of the lever out of the path of lug 97 and permit the shaft 45 to turn.

The normal operation is as follows: Supposing the proper coin to be in the lower end of chute 82 and resting on sleeve 90. The operator turns shaft 45 by the operating crank arm and the short crank arm 91 will engage the coin in the chute 82, the coin serving to couple the crank arm 91 and chute 82 and swing the chute to move the locking lever 95 and permit the shaft to complete its turning movement to eject a carton, as above explained. The upper end of arm 91 is made with a prong $99^a$ to catch over the upper edge of the coin and when the chute has been moved from over the sleeve 90 the pronged ends of arm 91 will force the coin out of the chute down into a coin box 100 below and the parts can then be returned to their normal positions, by their several springs. The coin box 100 is preferably secured in a compartment 101 in the bottom of the casing by a locked door 102 and the cartons or boxes are delivered into a depressed pocket 103 in the front and lower end of the machine, said depressed pocket causing the cartons to be delivered on end in convenient position to be removed. A weight 104 is located in each and every channel on top of the pile of cartons or boxes to compel them to drop as the bottom cartons are ejected and when a channel is empty the weight will be in the bottom of the channel. Each weight 104 is provided with a lug 105, which when the weight is in the bottom of a channel and that channel is turned to vending position will engage a curved plate 106 on the end of spring or weight held lever 107 and move the latter sufficiently to compel a deflecting finger 108 on the lever 107 to project into the slotted lower end of the coin chute. Hence should a coin be dropped into the machine when the empty channel is at the vending point, the finger 108 will deflect the coin out through a slot in the side of the chute where it will strike a guide chute 109 and directed into the delivery pocket back to the purchaser.

A gate 110 constitutes the front wall of chute 82 at its lower portion, and this gate 110 is hinged at its upper edge as shown and provided with a spring 111 normally holding the gate in its closed position. The purpose of this gate is to prevent any clogging of the machine in the event more than a single coin is placed in the chute and it will be seen that with a hinged gate of this kind, the movement of the arm 91 against one or more coins will, after moving the coin from one sleeve cause the coin to turn at an angle if it does not readily leave the chute, hence such movement of the coin will move the gate outward and drop all the coins in the chute into the cash box below. The hub of crank arm 47 is provided with a toothed segment 112 engaged by a double acting spring held dog 113 which compels the shaft to complete its turning movement after starting and a spring 114 connects a web 115 on the hub with the casing 44 to assist in returning the shaft to its normal position.

The general operation is as follows: The purchaser turns the cylinder until he brings the desired channel of goods, as indicated by the display compartment above, to the delivery point. He then inserts a coin in the coin slide and pushes the latter in to drop the coin down the coin chute and then by turning crank arm 46 he operates the ejector to eject a carton or box into the delivery compartment. Suitable instructions may be secured to or printed on the machine and the casing may be ornamented in any desired manner to suit the trade. A great many changes might be made in the general form and arrangement of the parts described without departing from my invention and hence I do not restrict myself to the precise details set forth but consider myself at liberty to make such changes and alterations as fairly fall within the spirit and scope of my invention.

Having fully described my invention what I claim as new and desire to secure by Letters-Patent, is:—

1. In a vending machine, the combination with a rotary cylinder having an annular series of vertical channels for goods to be vended, of an ejector to eject goods from any channel, means for centering the several channels to properly deliver the goods from the channel, and a locking device to hold the centering device and lock the cylinder against rotary movement of the cylinder during the entire operation of the ejector.

2. In a vending machine, the combination with a rotary cylinder comprising an annular series of vertical channels for goods to be vended, of an ejector to eject goods from any channel, a centering device to center any channel in position to deliver its goods, a locking device to secure the cylinder against turning and held out of operation when the ejector is in normal and idle position.

3. In a vending machine, the combination with a rotary cylinder comprising an annular series of vertical channels for goods to be vended, of an ejector to eject goods from any channel, a star wheel turning with the cylinder, a pivoted dog engaging the star wheel to center the channels for proper delivery of their goods, a locking lever, a spring to move the lever into position to lock the dog against the star wheel and prevent movement of the cylinder, and an arm on the ejector engaging the lever and holding it out of locking position when the ejector is in normal position.

4. In a vending machine, the combination with a rotary cylinder comprising an annular series of vertical columns for goods to be vended, of means for rotating said cylinder to position any of said compartments to permit goods to be delivered therefrom and a governor brake connected with said cylinder to prevent the cylinder from being rotated with sufficient rapidity to discharge goods therefrom by centrifugal action.

5. In a vending machine, the combination with a casing having a transparent cover thereon, of a rotary cylinder in the casing a central shaft to which the cylinder is secured projecting through the transparent cover to display tray secured on the shaft above the cylinder, a knob having a sleeve to receive the upper end of the shaft and keyed to turn the same, said sleeve extending through the cover, a vertical shaft in the display tray, a cam thereon to enter an annular groove in the knob sleeve, and an arm under the tray to turn the cam into or out of the groove in the knob sleeve, thus providing an internal lock for the knob which must be operated from the inside of the machine.

6. In a vending machine, the combination with a casing and a transparent cover thereon, of a central shaft therein projecting up through the cover, a goods containing cylinder secured on the shaft in the cylinder, a knob on the upper end of the cylinder, and internal mechanism locking the knob to the shaft and securing the cover on the casing.

7. In a vending machine, the combination with a rotary cylinder comprising an annular series of vertical channels, rods pivoted at their lower ends, and spring tongues receiving the upper ends of the rods to hold the goods in the channels.

8. A rotary goods containing cylinder for vending machines, comprising two spiders having radial slots therein, partition plates projected through the slots and having tongues on their ends bent down against the spiders, and longitudinal rotary rods connecting the spiders.

9. In a vending machine, the combination with a rotary cylinder comprising an annular series of vertical channels for goods, of an ejector, a fixed rod on which the ejector is mounted, a track web parallel with the rod, a notched tongue on the ejector movable on the web or track, a pivoted ejector finger to engage back of the goods to eject them and depressed by the goods to pass beneath them on the return movement of the ejector, and a spring holding the ejector finger in its normal position.

10. In a vending machine, the combination with a casing and a transparent cover therefor, of rings embracing the outer edge of the cover, and the upper edge of the casing, rings embracing the inner edge of the cover a rotary goods receptacle within said casing, a shaft to which said receptacle is secured, a knob attached to said shaft and disposed over one of said inner rings, and a locking device under the cover and engaging said knob.

In testimony whereof, I have signed this specification in the presence of two subscribing witnesses.

GEORGE D. SCHRUM.

Witnesses:
JNO. J. THEISEN,
J. A. WILMORE.